Jan. 25, 1938.　　　D. K. BADERTSCHER　　　2,106,292
VACUUM CONTROLLED TRANSMISSION
Filed March 11, 1935　　　6 Sheets-Sheet 1

Fig.1

Inventor
D. K. Badertscher
By Dike, Calver & Gray
Attorneys.

Jan. 25, 1938.                D. K. BADERTSCHER                2,106,292
                        VACUUM CONTROLLED TRANSMISSION
                    Filed March 11, 1935        6 Sheets-Sheet 2

Inventor:
D. K. Badertscher
By Dike, Calver & Gray
Attorneys.

Jan. 25, 1938.  D. K. BADERTSCHER  2,106,292
VACUUM CONTROLLED TRANSMISSION
Filed March 11, 1935  6 Sheets-Sheet 5

Inventor:
D. K. Badertscher
By Dike, Calver & Gray
Attorneys.

Patented Jan. 25, 1938

2,106,292

UNITED STATES PATENT OFFICE 2,106,292

VACUUM CONTROLLED TRANSMISSION

Dana K. Badertscher, Detroit, Mich., assignor to Hudson Motor Car Company, Detroit, Mich., a corporation of Michigan Application March 11, 1935, Serial No. 10,448

18 Claims. (Cl. 74—334)

This invention relates to change speed mechanism and more particularly to a pressure or vacuum controlled means for shifting such mechanism to transmit power at any speed ratio provided by the mechanism.

The conventional transmission or change speed mechanism employed in motor vehicles is provided with a manually operated shift lever for shifting the mechanism so power may be transmitted from the motor to the propeller shaft through different speed ratios at the will of the operator of the vehicle. This shift lever extends through the top of the transmission casing adjacent the floor of the vehicle to a point adjacent the operator's seat so as to be conveniently accessible. When so positioned the shift lever obstructs the floor space and the space adjacent the operator's seat.

It is an object of the present invention to provide means for shifting a change speed mechanism such that the usual manually operated shift lever may be eliminated thereby leaving the space adjacent the operator unobstructed and increasing the comfort of the occupants of the car.

The invention contemplates means actuated through pressure differentials for shifting a change speed mechanism which means is controlled at the will of the operator through preselective means conveniently accessible to the operator. Where the invention is embodied in a motor vehicle the reduced pressure created in the engine manifold may be utilized as a source of power. Inasmuch as it is necessary to disengage the clutch, through which the power of the engine is transmitted, in order to shift a change speed mechanism, the control means is provided with a control member associated with the clutch and actuated as the clutch is moved between its engaged and disengaged positions. In its preferred form, the invention provides two manually operable devices by which the operator may cause power to be applied to the shifting means to shift the change speed mechanism to any desired position. One of these devices may be positioned conveniently accessible to the operator, as upon the instrument board of a motor vehicle, and serves to enable the operator to preselect the change to be made but which does not effect the change until the other device, which is associated with the clutch, is actuated by moving the clutch between its engaged and disengaged positions.

The invention will be more clearly understood from the following description in conjunction with the accompanying drawings, in which.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
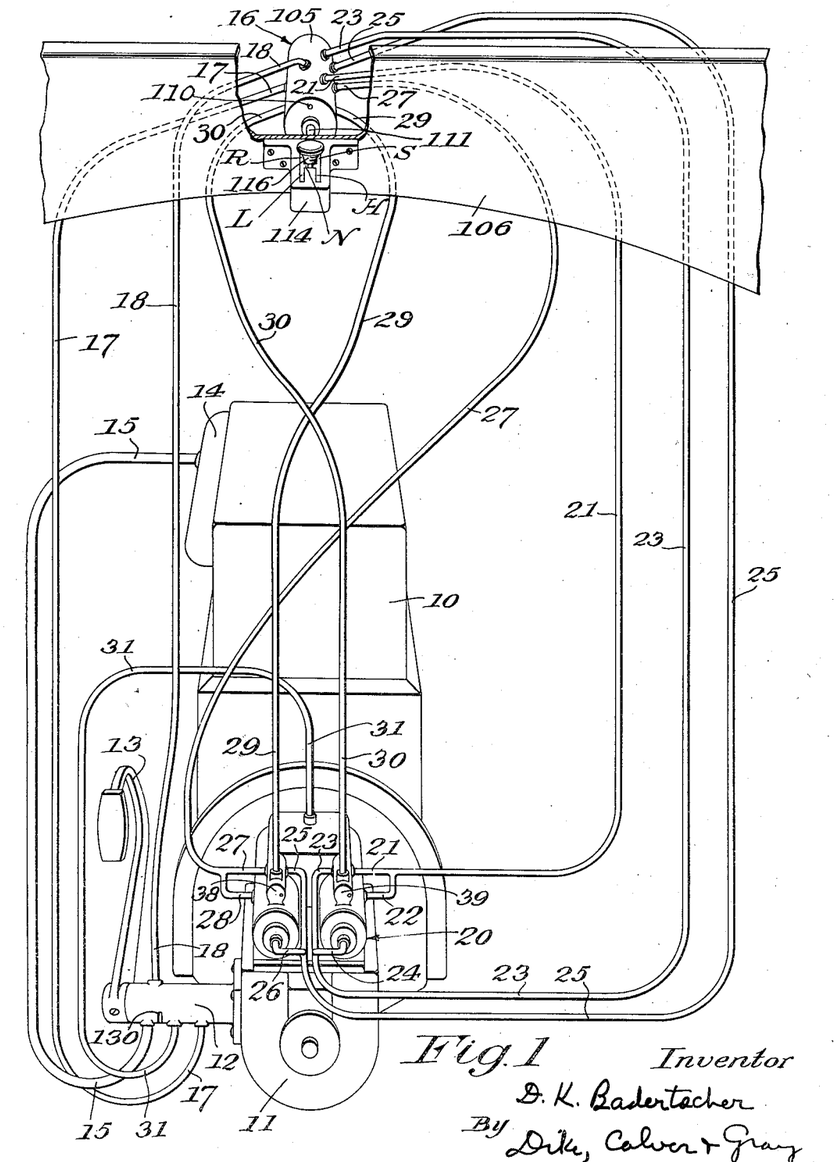
Fig. 1 is a diagrammatic view of a portion of a motor vehicle embodying the invention.
Figure 2:
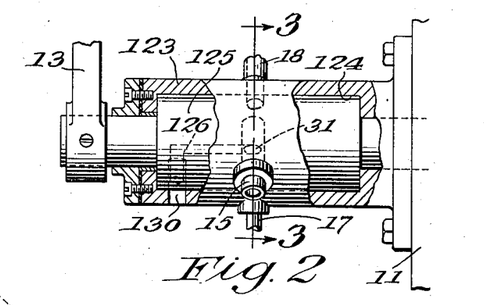
Fig. 2 is an elevational view, partly in section, of one of the parts of the device of the invention.

The invention is illustrated in the accompanying drawings as embodied in a motor vehicle driven by an internal combustion engine 10 and provided with a transmission 11. The vacuum control mechanism includes a master valve, indicated as a whole at 12, which may be suitably secured to the casing of the transmission 11 and is actuated by the clutch operating pedal 13. The master valve 12 communicates with the engine manifold 14 through a conduit 15 and through conduits 17 and 18 with a selector valve, indicated as a whole at 16. The selector valve 16 communicates with a shift mechanism, indicated as a whole at 20, mounted on top of the transmission 11. Selective communication between the shift mechanism and selector valve is accomplished through a conduit 21 having a branch 22, conduit 23 having a branch 24, conduit 25 having a branch 26, conduit 27 having a branch 28, and conduits 29 and 30. The master valve also communicates directly with the shift mechanism 20 through a conduit 31.

Figure 7:
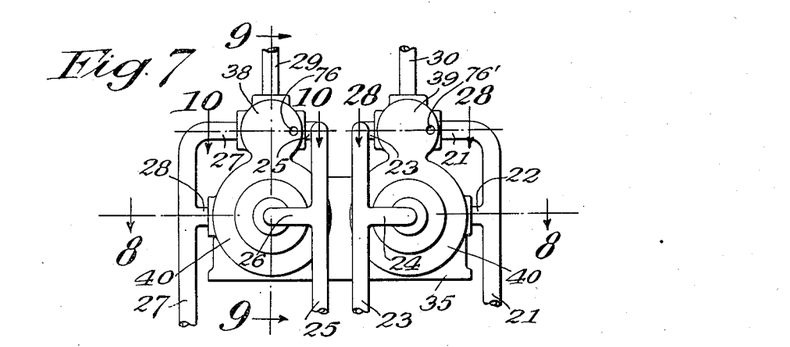
Fig. 7 is an end elevational view of the top portion of the transmission casing.
Figure 8:
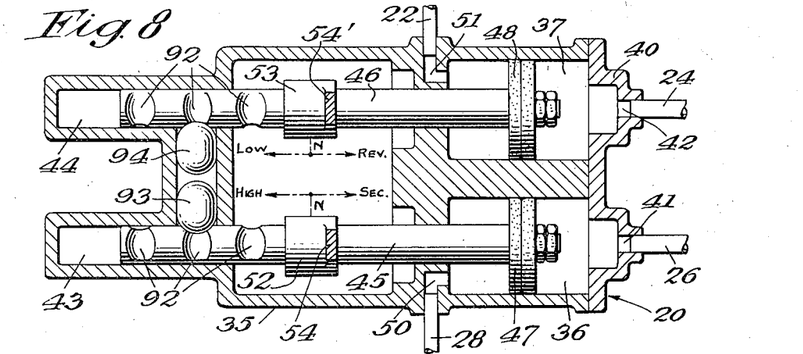
Fig. 8 is a sectional view taken upon the line 8—8 of Fig. 7.
Figure 9:
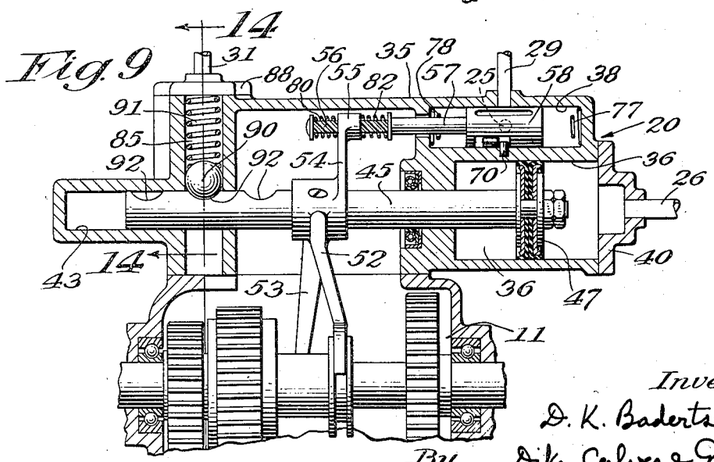
Fig. 9 is a sectional view taken upon the line 9—9 of Fig. 7.

Referring to Figs. 7, 8 and 9, the shift mechanism 20 comprises a casing 35 closing the top of the transmission 11 and providing at one end thereof cylinders 36 and 37 disposed beneath valve chambers 38 and 39. The outer ends of the cylinders 36 and 37 are closed by a cover plate 40 having openings 41 and 42 in which the conduits 26 and 24 are connected respectively. The other end of the casing 35 is provided with guide chambers 43 and 44 for shift rails 45 and 46 respectively. The shifting rails 45 and 46 extend into the cylinders 36 and 37 respectively and are connected to shifter pistons 47 and 48 movable within the cylinders 36 and 37 respectively. The branch conduit 28 is connected to a passage 50 communicating with the interior of the cylinder 36 and the branch conduit 22 is connected to a passage 51 communicating with the interior of the cylinder 37. Shift forks 52 and 53 are fixed upon the shifting rails 45 and 46 respectively.

Mounted within the casing 35 for the shift mechanism is what is herein termed for convenience a neutralizing valve unit which is provided to permit a cross-over shift from one shifting rail to the other, such as from low gear to high gear. The neutralizing valve unit includes a pair of valves connected to the shifter forks 52 and 53 and operable within chambers or cylinders 38 and 39, as hereinafter described. Also mounted within the casing 35 is an interlock unit including a vacuum and spring actuated interlock trigger 97 functioning to arrest the travel of the shifting rails at neutral position and to maintain them in such position at predetermined times.

The neutralizing valve unit is illustrated particularly in Figs. 9 to 13 inclusive and Figs. 26 to 29 inclusive. An arm 54 projects upwardly from the shift rail 45 and is provided with a threaded boss 55 engaging the threaded outer end 56 of a rod 57 which extends into the valve chamber 38 and is secured to neutralizing valve 58 therein. The valve chamber 38 is provided with openings in which the conduits 29, 25 and 27 are connected. The valve 58 (Figs. 10 to 13) is provided with spaced longitudinal grooves 62, 63 and 64 each connected by a transverse groove 65, the grooves 63 and 64 being connected by a transverse groove 66 and the grooves 62 and 63 being connected by a transverse groove 67. The external grooves 62, 63, 64, 65, 66 and 67 form an endless tortuous track (see arrows in Fig. 10) adapted to be engaged by a control pin 70 carried by the casing 35. The valve 58 is also provided at the opposite side thereof with longitudinal external grooves 71 and 72 connected by a passage 73 extending angularly through the valve body. The casing 35 is provided with an opening 76 providing communication between the interior of the valve chamber 38 and the surrounding atmosphere. A coil spring 77 is positioned at one end of the valve chamber 38 while a coil spring 78 is positioned at the other end of the valve chamber and surrounds the rod 57. A coil spring 80 surrounds the threaded portion 56 of the rod 57 and is interposed between the boss 55 and a washer 81. A coil spring 82 also surrounds the threaded portion 56 and is interposed between a washer 83 and the other side of the boss 55.

The construction of the neutralizing valve 58' and associated parts is similar to that of its companion valve 58. An arm 54' projects upwardly from the shift rail 46 and is provided with a threaded boss 55' engaging the threaded outer end 56' of the rod 57' which extends into the valve chamber 39 and is secured to neutralizing valve 58' therein, see Figs. 26 to 29. The valve chamber 39 is provided with openings in which the conduits 30, 21 and 23 are connected. The valve 58' (similar to valve 58) is provided with spaced longitudinal grooves 62', 63' and 64' each connected by a transverse groove 65', the grooves 63' and 64' being connected by a transverse groove 66' and the grooves 62' and 63' being connected by a transverse groove 67'. The grooves 62', 63', 64', 65', 66', and 67' form an endless tortuous track adapted to be engaged by a control pin 70' carried by the casing 35. The valve 58' is also provided with longitudinal grooves 71' and 72' connected by a passage 73'. The casing 35 is provided with an opening 76' providing communication between the interior of the valve chamber 39 and the surrounding atmosphere. A coil spring 77' is positioned at one end of the valve chamber 39 while a coil spring 78' is positioned at the other end of the valve chamber and surrounds the rod 57'. A coil spring 80' surrounds the threaded portion 56' of the rod 57' and is interposed between the boss 55' and a washer 81'. A coil spring 82' also surrounds the threaded portion 56' and is interposed between a washer 83' and the other side of the boss 55'.

The interlock unit is mounted within the opposite end of the casing 35 and comprises spaced chambers 85 and 86 (see Figs. 9, 14 and 15) disposed above the shift rails 45 and 46 respectively. It also includes an intermediate chamber 87 interposed between the chambers 85 and 86. The top of the chambers 85, 86 and 87 is closed by a cover plate 88 having an opening communicating with the interior of the chamber 87 and in which the conduit 31 is connected. A ball 90 is disposed in each of the chambers 85 and 86 and is urged downwardly therein by a spring 91 into one of the notches 92 in the shift rails. A pair of pellets 94 are positioned in a passage 93 connecting the guide passages 43 and 44. A piston 95 is movably positioned in the chamber 87 and is urged downwardly therein by a spring 96. This piston is fastened to a rod or plunger 97, herein termed the interlock trigger, which extends freely through a passage 98 into the passage 93 and is provided with a wedge shaped lower end 99 adapted to enter between and separate the pellets 94 so as to urge one or both into any one of a series of three side notches 100 in the shift rails 45 and 46. In the present instance the middle notch 100 of the series of three on the side of each shifter rail is sufficiently deeper than the other two shallow notches so as to provide a positive arresting and locking of the rail at neutral when a pellet 94 is engaged therein. The shallower notches cooperate with the pellets in the different gear positions to prevent jumping out of gear.

Figure 30:
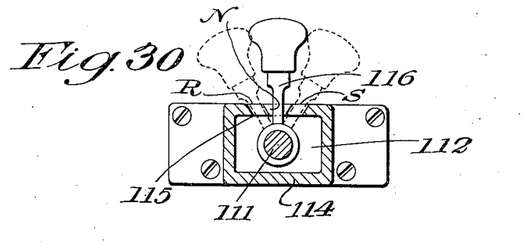
Fig. 30 is a sectional elevational view of one of the parts of the device of the invention.

The selector valve 16 comprises a casing 105 which may be secured to the instrument panel 106 of the vehicle (or steering column) and provides a cylindrical chamber 107 in which a valve member 108 is rotatably and axially movable. The casing 105 is formed with openings 109 and 110 providing communication between the interior of the chamber 107 at opposite sides of the valve member 108 and the atmosphere. The valve member 108 is provided with a valve rod 111 which projects through a bearing in the end of the casing 105 and into a cavity 112 in a control box 114 which, in the present instance, is suitably secured to the instrument panel 106, see Figs. 1, 16 and 30. The valve member 108 is provided with longitudinal grooves 118 and 119 which extend to opposite ends of the valve member and is also provided with passages 120 and 121. The casing 105 is provided with openings in which the conduits 18, 17, 29, 30, 21, 23, 27 and 25 are connected.

Figures 16, 17, 18, 19, 20:
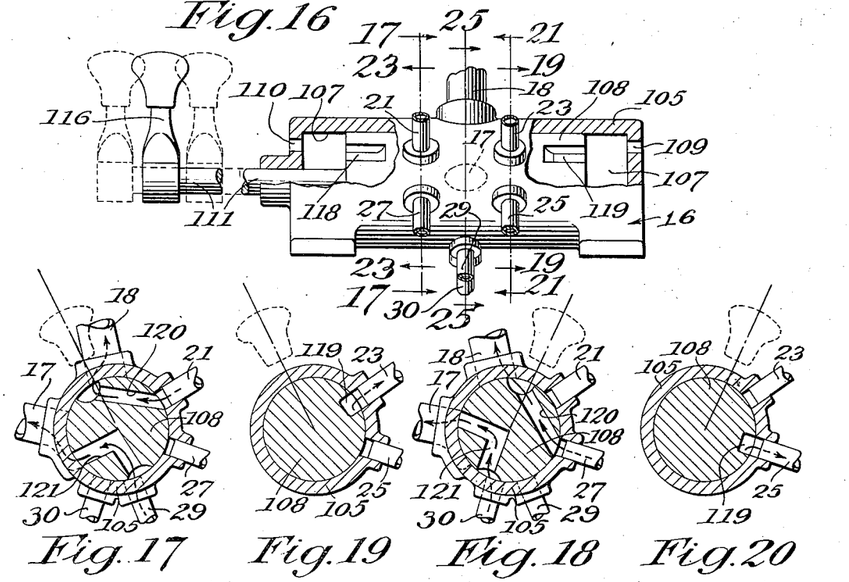
Fig. 16 is a longitudinal elevational view, partly in section, of one of the parts of the device of the invention.
Figs. 17 and 18 are sectional views taken upon the line 17—17 of Fig. 16 illustrating the relationship of the parts when in different positions.
Figs. 19 and 20 are sectional views taken upon the line 19—19 of Fig. 16 when the parts are in the positions shown in Figs. 17 and 18 respectively.
Figure 21:
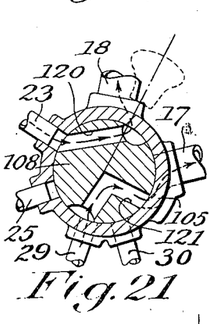
Figs. 21 and 22 are sectional views taken upon the line 21—21 of Fig. 16 illustrating the relation of the parts when in different positions.
Figure 22:
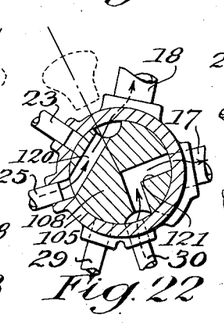
Figure 23:
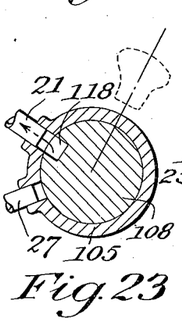
Figs. 23 and 24 are sectional views taken upon the line 23—23 of Fig. 16 illustrating the relationship of the parts when in the positions shown in Figs. 21 and 22 respectively.
Figure 24:
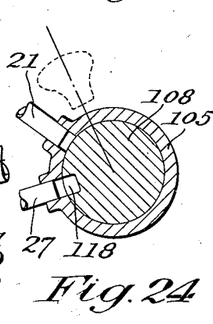
Figure 25:
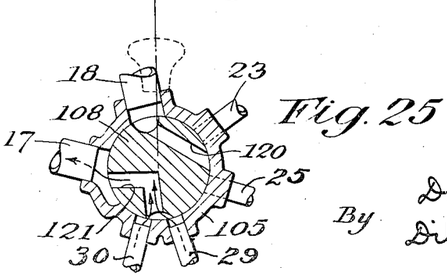
Fig. 25 is a sectional view taken upon the line 25—25 of Fig. 16.

The control box 114 is provided with a slot 115 of H-shape which communicates with the cavity 112. A selector or control arm 116 is secured upon the end of the rod 111 and extends through the slot 115, a knob being secured at its upper end to facilitate manipulation by the operator. The H-shaped slot 115 provides portions L, S, H, R and N within which arm 116 may be shifted to cause the selector valve member 108 to be brought to positions corresponding to the low, intermediate, high, reverse and neutral positions of the transmission. The low speed position of the valve 108 is indicated in Figs. 17 and 19, the intermediate or second gear position is indicated in Figs. 22 and 24, the high gear position is indicated in Figs. 18 and 20, the reverse gear position is indicated in Figs. 21 and 23, and the neutral position is indicated in Fig. 25.

Referring to Figs. 2 to 6 inclusive, the master valve 12 comprises a casing 123 providing a cylindrical valve chamber 124 in which a valve member 125 is rotatably mounted. The valve member 125 has a reduced end extending through a bearing in one end of the casing 123 and the clutch operating pedal 13 is fastened thereto. The valve member 125 is provided with a longitudinal groove 126 and with intersecting radial passages 127, 128 and 129. The valve casing 123 is provided with openings in which the conduits 18, 31, 17 and 15 are connected and is also provided with a slot or opening 130 communicating directly with the atmosphere and which is so arranged with respect to the groove 126 that the latter is at all times in communication with the atmosphere. The groove 126 and the passages 127, 128 and 129 are so arranged with respect to each other and with respect to the openings in the casing 123 in which the conduits 18, 31, 17 and 15 are connected that they assume the positions with respect to one another as indicated in Figs. 3, 4, 5 and 6 as the clutch pedal 13 is depressed to move the clutch between its engaged and disengaged positions.

*Operation*

Figure 10:
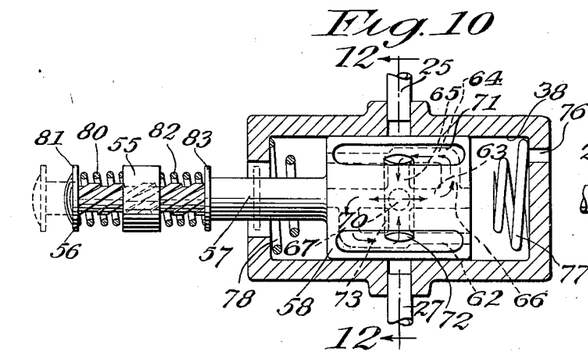
Figs. 10 and 11 are sectional views taken upon the line 10—10 of Fig. 7 illustrating the relation of the parts when in different positions.
Figure 11:
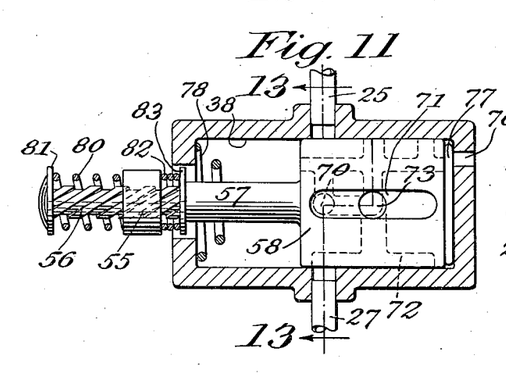
Figure 12:
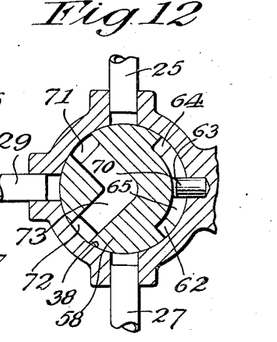
Fig. 12 is a sectional view taken upon the line 12—12 of Fig. 10.
Figure 13:
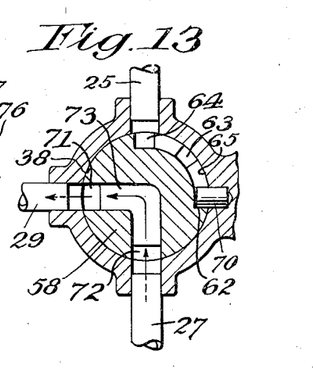
Fig. 13 is a sectional view taken upon the line 13—13 of Fig. 11.

When the transmission is in its neutral position the neutralizing valve 58 is in the position indicated in Figs. 10 and 12 and the companion neutralizing valve 58' is in a corresponding position. When reduced pressure is applied to the piston 47 to move it to the right from the position indicated in Fig. 8, the neutralizing valve 58 is moved to the right from the position shown in Fig. 10 to the position indicated in Fig. 11 and in so doing the spring 77 is compressed arresting axial movement of the valve member 58. Piston 47 and hence the boss 55 continue their axial travel, however, to fulfill the shift and as the boss travels longitudinally over the spirally threaded portion 56 it will rotate the valve 58, and at the same time compress spring 82, thereby bringing the valve member to the position indicated in Fig. 13 and connecting the conduits 29 and 27. It will now be seen that when reduced pressure is applied to piston 47 through conduit 29, passage 73 in valve 58, conduit 27 and branch 28, the piston is urged from the position mentioned above (second gear) back to neutral, Fig. 8, and at the same time the valve member 58 is caused to move enough to the left by the spring 77 (since its pressure is greater than spring 82) to engage groove 62 with pin 70, thereby locking the valve 58 against rotation and maintaining the connection between conduit 29 and 27 through groove 71, passage 73, and groove 72 in valve 58 which circuit induces the piston to move to neutral. As the piston 47 moves back to neutral position the boss 55 carries the valve 58 to its neutral position at which time spring 82 will expand, equalizing the pressures between springs 80 and 82 and rotating the valve 58 by so doing, the control pin 70 at this time traveling through the lower portion of track or groove 65 to its neutral position shown in Fig. 10.

Figure 26:
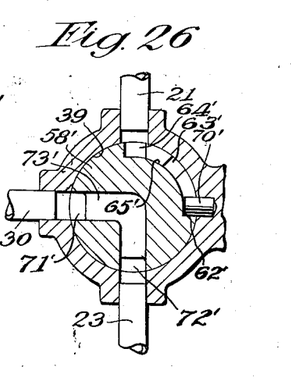
Figs. 26 and 27 are sectional views taken upon the lines 26—26 and 27—27 of Figs. 28 and 29 respectively.
Figure 27:
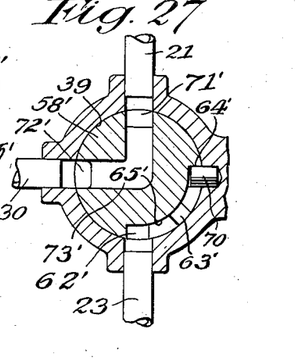
Figure 28:
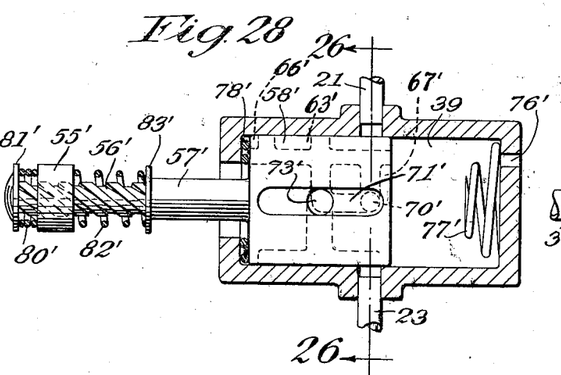
Figs. 28 and 29 are sectional views taken upon the line 28—28 of Fig. 7 illustrating the relation of the parts when moved to different positions.
Figure 29:
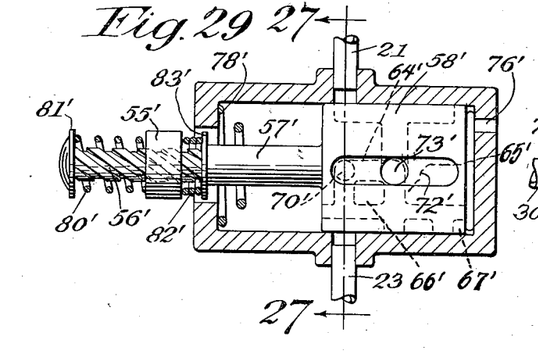

When reduced pressure is applied to the piston 48 to move it to the left from the position indicated in Fig. 8 to bring the transmission into low gear, the valve member 58' is first caused to move to the left to the position shown in Fig. 28 and is then caused to rotate to connect the conduits 23 and 30 as shown in Fig. 26. When reduced pressure is applied to the piston 48 to move it to the right from the position indicated in Fig. 8 to bring the change speed mechanism to its reverse speed position, the valve member 58' is caused to move to the right and then rotate to connect the conduits 21 and 30.

Figure 14:
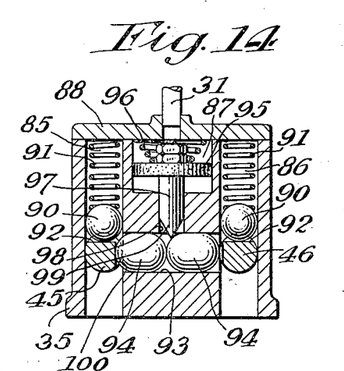
Figs. 14 and 15 are sectional views taken upon the line 14—14 of Fig. 9.
Figure 15:
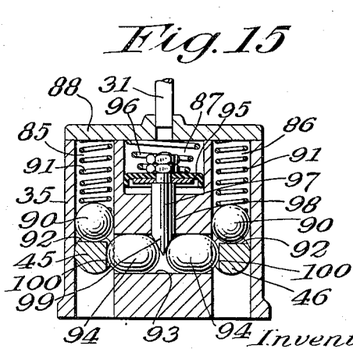

When the transmission is in its neutral position and the piston 95 is subjected to atmospheric pressure, the trigger 97 is held in the position indicated in Fig. 15 thereby locking the pellets 94 in the notches 100 in the shift rails 45 and 46. At the same time the springs 91 force the balls 90 into the intermediate notches 92 in the top of the shift rails 45 and 46. When reduced pressure is applied to the piston 95 it is caused to move against the action of the spring 96 from the position shown in Fig. 15 to that shown in Fig. 14 and thus unlock the shift rails 45 and 46 and permit them to be moved axially in either direction. When the transmission is either in its low or reverse position and the piston 95 is subjected to atmospheric pressure, the piston rod 97 urges the pellet displaced by the shift rail 46 against the side of that particular shift rail (Fig.

14) thereby producing pressure additional to the spring 91 to arrest the shift rail 46 when returned to neutral position shown in Fig. 15. Similarly, when the change speed mechanism is either in its high or intermediate speed position and the piston 95 is subjected to atmospheric pressure the pellet 94 is urged against the side of the shift rail 45 thereby producing pressure additional to the spring 91 to arrest the shift rail 45 when returned to neutral.

When the selector valve member 108 is moved to the low speed position indicated in Figs. 17 and 19, the conduits 18 and 21 are connected by the passage 120 and the conduits 17 and 29 are connected by the passage 121, and at the same time the conduit 23 is connected to the groove 119 which is open to atmospheric pressure. When the selector valve member 108 is moved to its intermediate speed position as indicated in Figs. 22 and 24, the conduits 18 and 25 are connected by the passage 120 and the conduits 17 and 30 are connected by the passage 121 and at the same time the conduit 27 is connected to atmospheric pressure through the groove 118. In its high speed position, as indicated in Figs. 18 and 20, the selector valve 108 connects the conduits 18 and 27 through the passage 120 and the passage 121 connects the conduits 17 and 30 and at the same time the conduit 25 is subjected to atmospheric pressure through the groove 119. When the selector valve member 108 is in its reverse speed position, as indicated in Figs. 21 and 23, the conduits 18 and 23 are connected by the passage 120 and the conduits 17 and 29 are connected by the passage 121 and at the same time the conduit 21 is subjected to atmospheric pressure through the groove 118. When the selector valve member 108 is in its neutral position, as indicated in Fig. 25, the conduit 18 is disconnected from each of the conduits 21, 27, 25 and 23 and the conduit 17 is connected to both of the conduits 29 and 30 by the passage 121.

Figure 3:
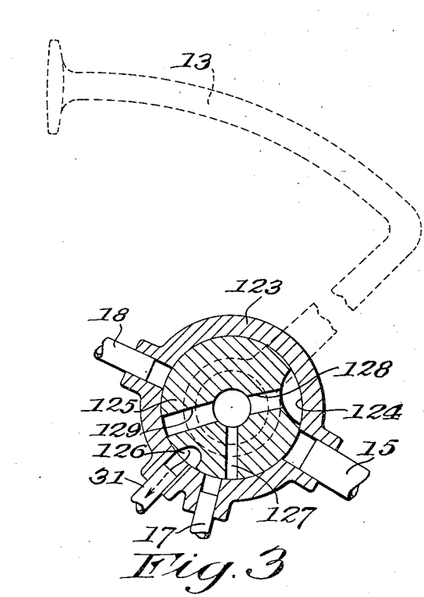
Figs. 3, 4, 5 and 6 are sectional views taken upon the line 3—3 of Fig. 2 illustrating the relationship of the parts when moved to different positions.
Figure 4:
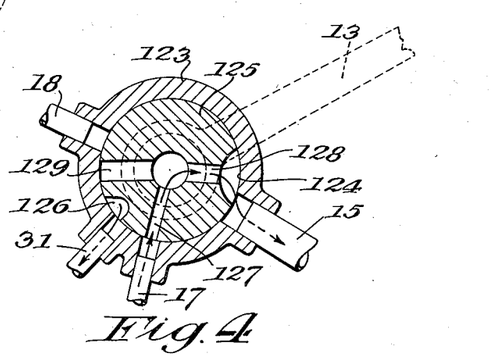

When the clutch is in its engaged position, the clutch operating pedal 13 and the master valve member 125 are in the position indicated in Fig. 3, thus permitting atmospheric pressure to be communicated to the piston 95 of the interlock unit through the conduit 31, groove 126 and slot 130. When the clutch is in its disengaged position, the clutch operating pedal 13 and the valve member 125 are in the position indicated in Fig. 6 thereby subjecting the piston 95 to reduced pressure through the conduit 31, passages 127 and 128 and conduit 15 leading to the engine manifold 14. When the valve member 125 is in this position, the conduit 18 leading to the selector valve 16 is connected with the conduit 15 through the passages 128 and 129. As the clutch is moved from its disengaged position to its engaged position, the connection between the conduit 15 and the conduit 18 is maintained until the conduit 15 and the conduit 17 are connected by the passages 127 and 128 as will be clearly seen from an examination of Figs. 5 and 4 which indicate successive positions of the master valve member 125 as the clutch is moved from its disengaged to its engaged position. It will be noted, as shown in Fig. 4, that when the conduit 15 is connected to the conduit 17, the conduit 31 is brought into communication with the atmospheric pressure through the groove 126 and the slot 130. As the valve member 125 is moved from the position shown in Fig. 4 to that shown in Fig. 3 the conduit 31 is still subjected to atmospheric pressure through the groove 126 and the slot 130.

Figures 5, 6:
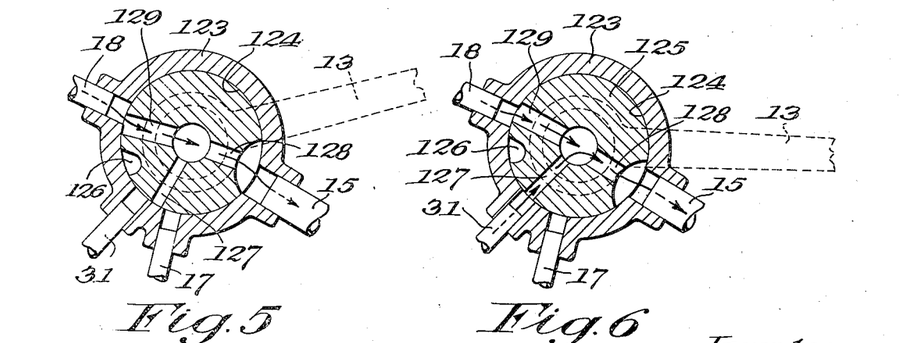

Assuming that the change speed mechanism is in its neutral position and it is desired to shift into the low speed ratio, the clutch pedal 13 is depressed to cause the master valve member 125 to move from the position shown in Fig. 3 to that shown in Fig. 6. The piston 95 is now subjected to reduced pressure through conduit 31, passages 127 and 128 and conduit 15 causing the piston to move upwardly to the position shown in Fig. 14 thereby unlocking the shift rails 45 and 46. While the valve member 125 is held in the position shown in Fig. 6, the arm 116 of the selector valve 16 is moved into the portion L of the H-shaped slot 115 to bring the valve member 108 to the position indicated in Figs. 17 and 19. It will be noted that the engine manifold 14 is now connected to the chamber 37 through the branch conduit 22, conduit 21, passage 120 of the selector valve, conduit 18, passages 129 and 128 of the master valve and thence through conduit 15 thereby subjecting the piston 48 to reduced pressure to move it to the left from the position shown in Fig. 8 to move the shift rail 46 to shift the change speed mechanism to its low speed position. It will be noted also that the opposite side of the piston 48 is subjected to atmospheric pressure through branch conduit 24, conduit 23 and groove 119. This movement of the piston 48 causes the valve member 58' to be moved to the position shown in Fig. 28 thereby connecting the conduits 30 and 23.

If it is now desired to shift the change speed mechanism from its low speed position to its intermediate speed position, the arm 116 of the selector valve 16 is then moved from the portion L through the portion N into the portion S of the H-shaped slot 115 thus causing the valve member 108 to be brought to the position shown in Fig. 25 and then to the position shown in Figs. 22 and 24. It must be borne in mind that the transmission is in low gear and the valve 58 is in position shown in Figs. 26 and 28 thus opening a passage through conduit 30 to conduit 23, branch 24 to chamber 37, at the same time connecting the atmosphere to the opposite end of chamber 37 through opening 76, passages 62 and 65, conduit 21 and branch 22. This prepares the low gear for a shift back into neutral whenever the clutch pedal reaches the position shown in Fig. 4, connecting the manifold through conduit 15, passage 128 and 127 in valve 125, conduit 17, passage 121 in valve 108 to conduit 30. Further depression of the pedal connects the engine manifold 14 to the chamber 36 through branch conduit 26, conduit 25, passage 120 of the selector valve, conduit 18, passages 128 and 129 of the master valve and thence through the conduit 15 thereby subjecting the piston 47 to reduced pressure to move it to the right from the position shown in Fig. 8 thus moving the shift rail 45 to shift the change speed mechanism to its intermediate speed position. It will be noted also that the opposite side of the piston 47 is subjected to atmospheric pressure through branch conduit 28, conduit 27 and groove 118. This movement of the piston 47 causes the valve member 58 to move from the position shown in Figs. 9 and 10 to that shown in Figs. 11 and 13, thus connecting the conduits 27 and 29.

Assuming that the engine is idling and it is desired to start the car in a forward direction, the control knob 116 is moved to pre-selected low gear position thus connecting tube 21 through its branch 22 to chamber 37 at the left or low speed side of piston 48. However, since the clutch pedal must be fully depressed before the vacuum is permitted to supply tube 18 from the manifold vacuum conduit 15, no shift into low gear can occur until the clutch pedal reaches its position of Fig. 6, at which time the vacuum will draw piston 48 to the left in Fig. 8, thus moving rail 46 and shifter fork 53 to mesh low gear. This shift cannot, however, be consummated until the manifold vacuum conduit is connected through passage 127 of the master valve with tube 31 whereupon trigger 97 is lifted by its piston, releasing the locking pellet 94 from the notch in rail 46.

After the clutch pedal is released to permit engagement of the clutch, and the car gathers momentum while in low gear, let it be assumed that the operator moves the control knob 116 into pre-selected high gear position, thus commanding a shift on the opposite rail 45. With the knob in high gear position the selector valve is thus positioned so as to connect tube 27 through its branch 28 to chamber 36 at the high gear side of piston 47 (Fig. 8). Upon depressing the pedal 13 to the position of Fig. 4 vacuum is supplied through the manifold conduit 15, passage 127 in the master valve and conduit 17 to the selector valve and thence through pipe 30 to neutralizing valve 58' connected through part 54' to the low and reverse shifter rail 46. Since the clutch and consequently the power may be disconnected at almost any point along the pedal travel, the neutralizing valve now connected to rail 46 is prepared to effect the return of the meshed low gear back to neutral as soon as the power load is released from the gear teeth. When the pedal 13 reaches the position of Fig. 5 thereby connecting the manifold vacuum line 15 with conduit 18 and thence through the selector valve by way of conduit 27 and its branch 28 to the high gear side of piston 47, as above stated, no shift into high gear at this time will occur on account of the interlock trigger 97 which still holds the pellet 94 in position to lock the rail 45 at neutral. When, however, the pedal reaches the position of Fig. 6 supplying vacuum from the manifold conduit 15 through the master valve and conduit 31 to the piston 95 of the interlock unit, the trigger 97 will be lifted thereby releasing pellet 94 and rail 45, and permitting the vacuum through tube 18 to shift piston 47 and mesh high gear.

From the foregoing it will be seen that the present invention provides a shifter device for each shifter rail and a system of controls by which any cross-over shift from one shift rail to another may be accomplished without the necessity, as heretofore, of a cross-over mechanism and a shifter finger. Since the cross-over shift and the double shift on the same rail are the basis of any combination of shifts, a typical double shift on one rail will now be described.

Assuming the car is to be started in reverse and then shifted into low gear, by shifting the control knob 116 into pre-selected reverse gear position and depressing the pedal 13 fully (Fig. 6), vacuum connection will be made from the manifold conduit 15 through passage 129 of the master valve (Fig. 6) to conduit 18 and thence through the selector valve by way of conduit 23 and branch 24 to chamber 37 at the reverse gear side of piston 48 (Fig. 8). At the same time the vacuum through conduit 31 releases the interlock trigger, permitting the shift into reverse. The control knob 116 is then moved into its low gear position, which pre-selection may be made, if desired, while the car is travelling in reverse with the clutch pedal released. Inasmuch as no connection can be made in the selector valve to the neutralizing valve by effecting a shift on the same rail, it is therefore apparent that the neutralizing valve performs no function when a double shift on the same rail is made. However, since the low gear position has been pre-selected, as above mentioned, the entire shift from reverse through neutral position into low gear will be consummated as soon as the pedal reaches its fully depressed position herein shown in Fig. 6.

I claim:

1. The combination of a pair of gear shift rails, a vacuum or pressure operated shifting device for independently shifting each rail, a movable master valve controlled by the clutch pedal and connecting a source of vacuum or pressure to said devices, a vacuum or pressure controlled locking means for the shift rails connected to said master valve, and valve means connected to said master valve for controlling the return of one shift rail to neutral position before the other rail is moved out of neutral position, said master valve being movable into successive positions in one direction to connect said source with said valve means, locking means and shifting devices.

2. The combination of a pair of gear shift rails, a vacuum or pressure operated shifting device for independently shifting each rail, a selector valve adapted to be manually set in different pre-selected gear shift positions, a master valve connected to a source of vacuum or pressure and connected to said devices through the medium of said selector valve, valve means connected to said rails and having vacuum or pressure connection with said master valve through the medium of said selector valve for returning one of the rails to neutral position when the other rail is to be shifted out of neutral position, and means for moving said master valve to sequentially connect said source with said valve means and devices.

3. The combination of a pair of gear shift rails, a vacuum or pressure operated shifting device for independently shifting each rail, a selector valve adapted to be manually set in different pre-selected gear shift positions, a master valve connected to a source of vacuum or pressure and connected to said devices through the medium of said selector valve, valve means connected to said rails and having vacuum or pressure connection with said master valve through the medium of said selector valve for returning one of the rails to neutral position when the other rail is to be shifted out of neutral position, and a clutch pedal for moving said master valve to sequentially connect said source with said valve means and devices.

4. The combination of a pair of gear shift rails, a vacuum or pressure operated shifting device for independently shifting each rail, a selector valve adapted to be manually set in different pre-selected gear shift positions, a master valve connected to a source of vacuum or pressure and connected to said devices through the medium of said selector valve, valve means connected to said rails and having vacuum or pressure connection with said master valve through the medium of said selector valve for returning one of the rails to neutral position when the other rail is to be shifted out of neutral position, a vacuum or pressure actuated interlock device for locking said rails in neutral position, and means for moving said master valve to sequentially connect said source with said valve means, interlock device and shifting devices.

5. The combination of a pair of separate gear shift rails, vacuum or pressure operated shifting means for independently shifting each rail, a selector valve adapted to be manually set in different pre-selected gear shift positions, a master valve controlled by the clutch pedal for connecting a source of vacuum or pressure to the selector valve, means for selectively connecting the selector valve to said shifting means, and mechanism interposed between said selector valve and shifting means and controlled by said master valve for returning one of said rails to neutral position prior to shifting the other rail out of neutral position, said mechanism including valve means connected to a shift rail and having a rectilineal movement with the rail and a rotative movement relative thereto.

6. The combination of a pair of separate gear shift rails, vacuum or pressure operated shifting means for independently shifting each rail, a selector valve adapted to be manually set in different pre-selected gear shift positions, a master valve controlled by the clutch pedal for connecting a source of vacuum or pressure to the selector valve, means for selectively connecting the selector valve to said shifting means, and a neutralizing valve having vacuum or pressure connection with the master valve through the medium of said selector valve for controlling the return of one of said rails to neutral position prior to shifting the other rail, said neutralizing valve being connected to a shift rail for rectilineal movement therewith and rotative movement relatively thereto.

7. The combination of a pair of separate gear shift rails, a vacuum operated piston for shifting each rail in opposite directions, a manually operated master valve connected to a source of vacuum, a selector valve adapted to be manually set in different pre-selected gear shift positions, vacuum conduits connecting said selector valve and said pistons, conduit means connecting said vacuum source and selector valve upon moving the master valve into predetermined position thereby to shift one or the other of said shift rails, locking devices for said rails, and vacuum operated means controlled by said master valve in sequence with the actuation of said pistons for releasing said locking devices to permit shifting of the rails.

8. The combination of a pair of separate gear shift rails, a vacuum operated piston for shifting each rail in opposite directions, a manually operated master valve connected to a source of vacuum, a selector valve adapted to be manually set in different pre-selected gear shift positions, vacuum conduits connecting said selector valve and said pistons, conduit means connecting said vacuum source and selector valve upon moving the master valve into predetermined position thereby to shift one or the other of said shift rails, locking devices for said rails, and vacuum operated means controlled by said master valve for releasing said locking devices to permit shifting of the rails, and means controlled by the movement of said master valve for shifting one of the rails into neutral position and locking it therein before the other rail is shifted out of neutral position.

9. The combination of a pair of separate gear shift rails, a vacuum operated piston for shifting each rail in opposite directions, a manually operated master valve connected to a source of vacuum, a selector valve adapted to be manually set in different pre-selected gear shift positions, vacuum conduits connecting said selector valve and said pistons, conduit means connecting said vacuum source and selector valve upon moving the master valve into predetermined position thereby to shift one or the other of said shift rails, locking devices for said rails, vacuum operated means controlled by said master valve for releasing said locking devices to permit shifting of the rails, and a neutralizing valve connected to each rail and connected to the master valve for controlling the shift of one of the rails into neutral position before the other rail is shifted out of neutral position.

10. The combination of a pair of separate gear shift rails, a vacuum operated piston for shifting each rail in opposite directions, a manually operated master valve connected to a source of vacuum, a selector valve adapted to be manually set in different pre-selected gear shift positions, vacuum conduits connecting said selector valve and said pistons, conduit means connecting said vacuum source and selector valve upon moving the master valve into predetermined position thereby to shift one or the other of said shift rails, locking devices for said rails, vacuum operated means controlled by said master valve for releasing said locking devices to permit shifting of the rails, and a neutralizing valve connected to each rail and connected to the master valve for controlling the shift of one of the rails into neutral position before the other rail is shifted out of neutral position, said neutralizing valve being inoperative when a single rail is shifted to effect a change of gears.

11. In combination, a change speed mechanism, a source of reduced pressure, shifting means adapted to be actuated to shift said mechanism, a manually operable valve, a plurality of connections between said valve and shifting means, a second valve, connections between said valves, said first mentioned valve being arranged to provide two separate connections between said shifting means and said second valve, said second valve being arranged to provide as it is moved communication between said source of reduced pressure and each of said separate connections separately and simultaneously.

12. In combination, a change speed mechanism, a clutch operatively associated with said mechanism, a source of reduced pressure, shifting means adapted to be actuated to shift said mechanism, a manually operable valve, a plurality of connections between said valve and shifting means, a second valve operatively associated with said clutch so as to be moved as said clutch is moved between its engaged and disengaged positions, and connections between said valves, said first mentioned valve being arranged to provide two separate connections between said shifting means and said second valve, said second valve being arranged to provide as it is moved communication between said source of reduced pressure and each of said separate connections separately and simultaneously.

13. In combination, a change speed mechanism, a source of reduced pressure, shifting means adapted to be actuated to shift said mechanism, a manually operable valve, a plurality of connections between said valve and shifting means, a second valve, connections between said valves, said first mentioned valve being arranged to provide two separate connections between said shifting means and said second valve, said second valve being arranged to provide as it is moved communication between said source of reduced pressure and each of said separate connections separately and simultaneously, and a valve actuated by said shifting means to open one of said separate connections as said change speed mechanism is shifted from neutral to another position and close said connection as said mechanism is shifted back to its neutral position.

14. The combination of a pair of gear shift rails, pneumatic means for separately shifting each rail, pneumatically controlled means for at least temporarily latching at least one rail in neutral position, and control means for successively actuating said shifting means to move said one rail to neutral position, releasing said latching means, and actuating said shifting means to move the other of the rails out of neutral position.

15. The combination of a pair of gear shift rails, separate means for shifting each rail, means for latching said rails in neutral position, and control means for successively causing the actuation of the shifting means to move one of said rails to neutral position and allow it to be latched therein, causing unlatching of the rails, and causing the actuation of the shifting means to move the other rail out of neutral position.

16. The combination of a pair of gear shift rails, separate pneumatic means for shifting each rail, pneumatically controlled means for latching said rails in neutral position, and control means for successively causing the pneumatic actuation of the shifting means to move one of said rails to neutral position and allow it to be latched therein, causing unlatching of the rails, and causing the pneumatic actuation of the shifting means to move the other rail out of neutral position.

17. The combination of a pair of gear shift rails, separate pneumatic means for shifting each rail, means resiliently urged to latch each rail in neutral position, pneumatic means for unlatching said latching means, and manual control means for successively energizing said shifting means to move one rail, if not in neutral position, to said position, energizing said unlatching means, and energizing one of said shifting means to move the other of said rails into drive engaging position.

18. The combination of a plurality of gear shift rails, separate means for shifting each rail, means for latching said rails in neutral position, and control means for successively causing the energization of the shifting means to move any rail but one to neutral position if it is out of neutral position and allow it to be latched therein, causing the unlatching of the rails and causing the energization of the shifting means to move said one rail to gear engaging position.

DANA K. BADERTSCHER.